US009169907B2

United States Patent
Schwarzbach

(10) Patent No.: US 9,169,907 B2
(45) Date of Patent: Oct. 27, 2015

(54) SPINDLE DRIVE

(71) Applicant: WITTENSTEIN AG, Igersheim (DE)

(72) Inventor: Michael Schwarzbach, Tauberbischofsheim (DE)

(73) Assignee: Wittenstein AG, Igersheim (DE)

( * ) Notice: Subject to any disclaimer, the term of this patent is extended or adjusted under 35 U.S.C. 154(b) by 95 days.

(21) Appl. No.: 13/926,587

(22) Filed: Jun. 25, 2013

(65) Prior Publication Data

US 2014/0000395 A1  Jan. 2, 2014

(30) Foreign Application Priority Data

Jun. 28, 2012  (DE) .......................... 10 2012 105 709

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 25/12 | (2006.01) |
| F16H 57/04 | (2010.01) |
| F16H 25/22 | (2006.01) |

(52) U.S. Cl.
CPC .............. *F16H 25/12* (2013.01); *F16H 57/043* (2013.01); *F16H 57/0497* (2013.01); *F16H 25/2204* (2013.01); *Y10T 74/18744* (2015.01)

(58) Field of Classification Search
CPC ............ F16H 25/2418; F16H 57/0421; F16H 57/043; B23Q 11/125; B23Q 5/40; F16C 33/6677
USPC ................ 74/89.43, 89.44, 424.71; 184/6.12; 384/385, 387, 391
See application file for complete search history.

(56) References Cited

U.S. PATENT DOCUMENTS

| | | | | |
|---|---|---|---|---|
| 3,454,136 | A * | 7/1969 | Stark ............................. | 184/6.12 |
| 5,809,838 | A * | 9/1998 | Miyaguchi et al. .......... | 74/89.44 |
| 6,732,600 | B2 | 5/2004 | Greubel | |
| 7,044,643 | B2 | 5/2006 | Greubel | |
| 7,431,510 | B2 | 10/2008 | Schott | |
| 7,435,924 | B2 | 10/2008 | Schmit-Walter et al. | |
| 2002/0117015 | A1* | 8/2002 | Greubel ....................... | 74/89.44 |
| 2002/0170369 | A1* | 11/2002 | Yabe ............................ | 74/89.44 |
| 2009/0133520 | A1* | 5/2009 | Chen et al. ................... | 74/89.44 |

FOREIGN PATENT DOCUMENTS

| | | |
|---|---|---|
| DE | 1575627 A1 | 1/1970 |
| DE | 3902857 A1 | 8/1990 |
| DE | 19519770 A1 | 12/1995 |

(Continued)

OTHER PUBLICATIONS

European Search Report for EP 13165382.6, dated Aug. 12, 2013.

*Primary Examiner* — David M Fenstermacher
*Assistant Examiner* — Jake Cook
(74) *Attorney, Agent, or Firm* — Bachman & LaPointe, P.C.

(57) ABSTRACT

A spindle drive (1), in particular for a linear actuator, having a spindle (3), a spindle nut (7) which interacts with the spindle (3), and a lubricating channel outlet (20) which opens into an intermediate space between the spindle (3) and the spindle nut (7) for lubricating the spindle (3) and the spindle nut (7), the spindle drive (1) comprising, moreover, a stationary channel system and a rotatable channel system which is connected to the stationary channel system for feeding lubricant to the lubricating channel outlet (20).

5 Claims, 4 Drawing Sheets

(56) References Cited

FOREIGN PATENT DOCUMENTS

| | | |
|---|---|---|
| DE | 10107706 A1 | 10/2002 |
| DE | 10235078 B4 | 4/2005 |
| DE | 102004043749 A1 | 3/2006 |
| DE | 19549719 B4 | 9/2007 |
| DE | 102008025072 A1 | 12/2009 |
| DE | 102009005886 A1 | 7/2010 |
| DE | 102009012432 A1 | 9/2010 |
| DE | 102009023984 A1 | 12/2010 |
| EP | 1233200 A2 | 8/2002 |
| EP | 1472040 B1 | 6/2006 |
| GB | 914165 A | 12/1962 |
| GB | 1132927 A | 11/1968 |
| JP | 2003269569 A | 9/2003 |

* cited by examiner

SPINDLE DRIVE

BACKGROUND OF THE INVENTION

The invention relates to a spindle drive for a linear actuator.

The prior art discloses spindle drives which are used to convert rotating movements into linear movements or vice versa. In particular in the case of spindle drives which are installed in compact linear actuators, relubrication is difficult or impossible, without removal or partial dismantling of the linear actuator or the spindle drive taking place. Maintenance during running operation is frequently completely ruled out.

The invention is based on the object of improving spindle drives which are known from the prior art; in particular, spindle drives which are installed in linear actuators are to be improved, with the result that simple relubrication is made possible. In particular, relubrication during running operation is to be possible.

SUMMARY OF THE INVENTION

The object is achieved by way of a spindle drive comprising a spindle nut which interacts with the spindle, and a relubricating device. The relubricating device is suitable for lubricating directly between the spindle and the spindle nut, the relubricating device having, for this purpose, a lubricating channel outlet which opens between the spindle and the spindle nut, for example into an intermediate space. An intermediate space can be provided between the spindle and the spindle nut, or the spindle and the spindle nut can bear against one another or can be separated merely by a lubricating film of the lubricant. In the case of embodiments with one or more lubricating channel outlets which are spaced axially apart from one another, typically at least one lubricating channel outlet opens directly between the spindle and the spindle nut, in particular in at least one operating state. In the case of further embodiments, typically at least one lubricating channel outlet opens directly between the spindle and the spindle nut or into an intermediate space between the spindle and the spindle nut in every operating state.

In embodiments, rolling bodies which reduce friction between the spindle and the spindle nut can be provided in the intermediate space between the spindle and the spindle nut. Examples for rolling bodies can be balls, rollers or cylinders. Further spindle drives have direct interaction of the spindle with the spindle nut.

Relubricating systems of embodiments have a stationary channel system and a rotating channel system which is connected to the stationary channel system, in order to guide lubricant to the lubricating channel outlet. The combination of a rotatable channel system with a stationary channel system achieves a situation where lubrication is also possible during the system. Here, the expression "rotatable" channel system is understood to mean that said channel system is rotated during operation or is received in a part which rotates during the operation, for example in a drive sleeve, or in a rotating spindle, if the embodiment comprises a rotatable spindle. A further possibility is that the rotatable channel system is arranged in the spindle nut if the latter is rotated in operation in the embodiment. Here, the expression "stationary" preferably means that the stationary channel system is arranged in a component or in components which is/are not rotated during operation. More preferably, the stationary channel system is arranged in components which are not rotated relative to a housing of the spindle drive or are not moved during operation. The combination of the channel systems makes flexible lubrication possible.

In typical embodiments, a transfer space is arranged between the stationary channel system and the rotatable channel system. The transfer space is usually configured to be at least partially concentric with respect to the longitudinal axis of the spindle. In embodiments, the transfer space is of annular configuration, it being possible for the annular shape to have interruptions in some embodiments. An annular transfer space affords the advantage of continuous loading of channels with lubricant. An at least partially concentric transfer space makes a simple arrangement possible in a housing or further components of the spindle drive. In general, a transfer space affords the advantage that a defined interface is provided between the rotatable channel system and the stationary channel system. The transfer space can also be called a rotary leadthrough, since a transition from a non-rotating system to a rotating system takes place at this location. In typical embodiments, the transfer space is sealed in the axial direction on one side or both sides by shaft sealing rings, sealing lips, sealing rings or other types of sealing systems. It is ensured in this way that a transfer of lubricant largely without losses is possible.

The stationary lubricating channels of the stationary channel system typically run from a stationary, outer position on the spindle drive to the transfer space. A course of this type can be effected, for example, within housing parts or components of the housing of the spindle drive. The rotatable lubricating channels of the rotatable channel system typically lead into the interior of the spindle drive and reach moving components or components to be lubricated there.

In typical embodiments, the rotatable channel system is arranged in the spindle. In embodiments of this type, the stationary channel system is typically arranged in a housing of the spindle drive. A rotatable channel system which is arranged in the spindle is concerned with embodiments, in which the spindle rotates during operation. By way of an arrangement of this type, lubricant can be introduced immediately between the spindle and the spindle nut via the rotating spindle, a channel or channels of the rotatable channel system in the spindle leading to the at least one lubricating channel outlet. In general, the lubricating channel outlet typically opens directly between the spindle and the spindle nut, for example into the intermediate space or onto the interface between the spindle and the spindle nut or directly onto the surface of the spindle outside the spindle nut. In further embodiments, intermediate channels can also be provided.

In customary embodiments having a rotatable channel system in the spindle, the spindle comprises a longitudinal channel and at least one radial channel which is connected to the longitudinal channel. The longitudinal channel can also be called an axial channel. In each case two radial channels are typically configured so as to lie opposite one another with regard to the longitudinal axis. A more uniform distribution of lubricant is achieved in this way, or an imbalance is avoided. It is possible by way of the longitudinal channel to distribute lubricant over the entire engagement region of the spindle, by a plurality of radial channels adjoining the longitudinal channel in a manner which is spaced apart axially. At least part of the radial channels typically open directly or indirectly into the lubricating channel outlet.

In embodiments, the spindle is connected fixedly to a hollow-shaft rotor so as to rotate with it, the rotating channel system also running through the hollow-shaft rotor. An arrangement of this type affords the advantage that lubrication can take place without dismantling of the hollow-shaft rotor. The hollow-shaft rotor is typically used to drive the spindle. Radial channels of the rotating channel system are usually arranged in the hollow-shaft rotor, but channels which additionally run in the axial direction can also be arranged in embodiments. In general, the expression "radial channel" is to be understood to mean channels of the type which have a radial directional component. The radial directional component can typically be more than 50%, that is to say the channels run at an angle of at most 45° relative to a radial direction of the spindle.

In further embodiments, the rotatable channel system is arranged in the spindle nut and comprises a radial channel. In embodiments having a rotating spindle nut, the invention affords the advantage that lubrication is possible, for example, in the center of the spindle nut. In typical embodiments, a plurality of radial channels can be arranged in the spindle nut, for example two or four channels which lie in each case opposite one another, are rotated by the same angle with respect to one another and lie in one plane. However, a plurality of radial channels can also be provided in a plurality of planes.

A further aspect of the invention is a linear actuator having a spindle drive in one of the above-described embodiments. A linear actuator of this type affords the advantage that no dismantling of housing, bearing, linear guide, motor sensor or sensor system is necessary for maintenance or lubrication. A linear actuator is typically an electromechanical drive system which converts a rotation into a linear movement. A rotor of an electric motor usually drives a spindle drive which then performs the linear movement. In addition to open linear actuators, in which the spindle drive is freely accessible, there are increasingly closed or compact linear actuators. In particular, compact linear actuators are distinguished by the advantage of a considerably reduced overall size. This can be achieved, for example, by means of a hollow-shaft rotor, in which the spindle drive is integrated. Precisely in the case of the compact systems, the inner spindle drive is scarcely accessible or cannot be accessed at all, since components, such as rotor, stator, housing, bearing, linear guide, motor sensor or sensor system, are as a rule arranged around the spindle drive, with the result that the latter is no longer directly accessible.

In embodiments, a lubricating nipple is arranged at one end of a channel of the stationary channel system, in order for it to be possible to introduce lubricant manually. In further embodiments, a connection for a lubricating system is provided on the stationary channel system, with the result that an automatic introduction of lubricant is possible. In embodiments, the lubricant is introduced when the drive is at a standstill or during running operation, for example in the case of a rotating spindle nut or rotating spindle.

A linear cylinder having an integrated spindle drive in accordance with one of the embodiments described here likewise represents one aspect of the invention. It is a further possibility in embodiments to integrate the spindle drive into an electromechanical linear actuator. In electromechanical linear actuators of this type, a hollow shaft can be provided as drive rotor. A further possibility is an additional integration of a gear mechanism, for example on the drive side for driving the spindle or the spindle nut.

BRIEF DESCRIPTION OF THE DRAWINGS

In the following text, exemplary embodiments of the invention will be explained in greater detail using the appended drawings, in which.

DETAILED DESCRIPTION

Figure 1:
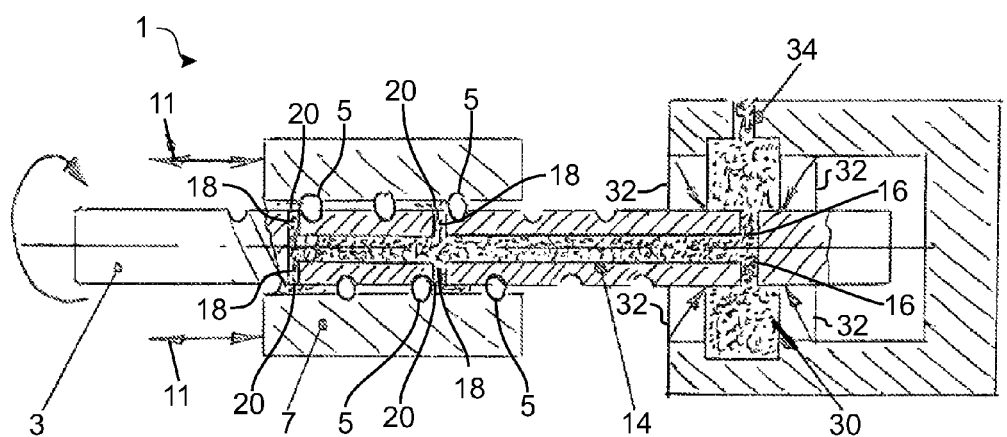
FIG. 1 shows a diagrammatic sectional view of one embodiment.

FIG. 1 shows one embodiment of a spindle drive 1. The spindle drive 1 has a spindle 3 which interacts via rolling bodies 5 with a spindle nut 7. In the embodiment of FIG. 1, the spindle 3 is mounted rotatably, it being provided during operation to drive the spindle 3, in order to achieve an axial movement along the double arrows 11 on the spindle nut 7.

A rotatable channel system which has a longitudinal channel 14 for lubricant along the center axis of the spindle 3 is provided within the spindle 3. Lubricant is indicated within the lubricant channels in a dotted manner in each case in all drawings, which lubricant is present at least temporarily in the channels during operation. However, the lubricant is generally not a constituent part of the invention.

The longitudinal channel 14 is supplied with lubricant by first radial lubricating channels 16. The lubricant is guided via the longitudinal channel 14 to second radial lubricating channels 18 which open into lubricating channel outlets 20. Lubricant is introduced by the lubricating channel outlets 20 into an intermediate space between the spindle 3 and the spindle nut 7, with the result that the rolling bodies 5 or the contact of the rolling bodies 5 with the spindle 3 and the spindle nut 7 are lubricated there. In the exemplary embodiment of FIG. 1, in each case two radial lubricating channels 18 which lie opposite one another with regard to the rotational axis and have lubricating channel outlets 20 are provided in two planes which are spaced apart axially, in order to achieve lubrication over a wide area of the spindle 3. In further embodiments, further or fewer radial lubricating channels can be provided with lubricating channel outlets.

In order to supply the rotatable channel system in the spindle 3, a rotary leadthrough is provided with a transfer space 30 which extends in an annularly concentric manner around the spindle in the region of the first radial lubricating channels 16. The first radial lubricating channels 16 can be loaded with lubricant via the transfer space 30.

In general, in embodiments, the lubricating channels of the rotatable channel system or of the stationary channel system or of both channel systems are configured with a free cross section. This means, for example, that the channels are material-free, metal-free or plastic-free or are free of material, metal or plastic which is arranged in the channel. This affords the advantage that lubricants can be fed along the channels in an unimpeded manner without appreciable resistance. In further embodiments, a material, metal, plastic or plastic foam is arranged at least in part of the channels, in order to achieve, for example, a slow distribution of the lubricant.

A stationary lubricating channel system is provided for supplying the transfer space 30 which is sealed by shaft seals 32. The stationary lubricating channel system provides at least one radially arranged stationary lubricating channel 34 in a housing 40, in which the shaft seals 32 are also arranged. Via the stationary lubricating channel 34, lubricant mixtures can be introduced into the channel system, for example, via a lubricating nipple or an automatic lubricating system.

Figure 2:
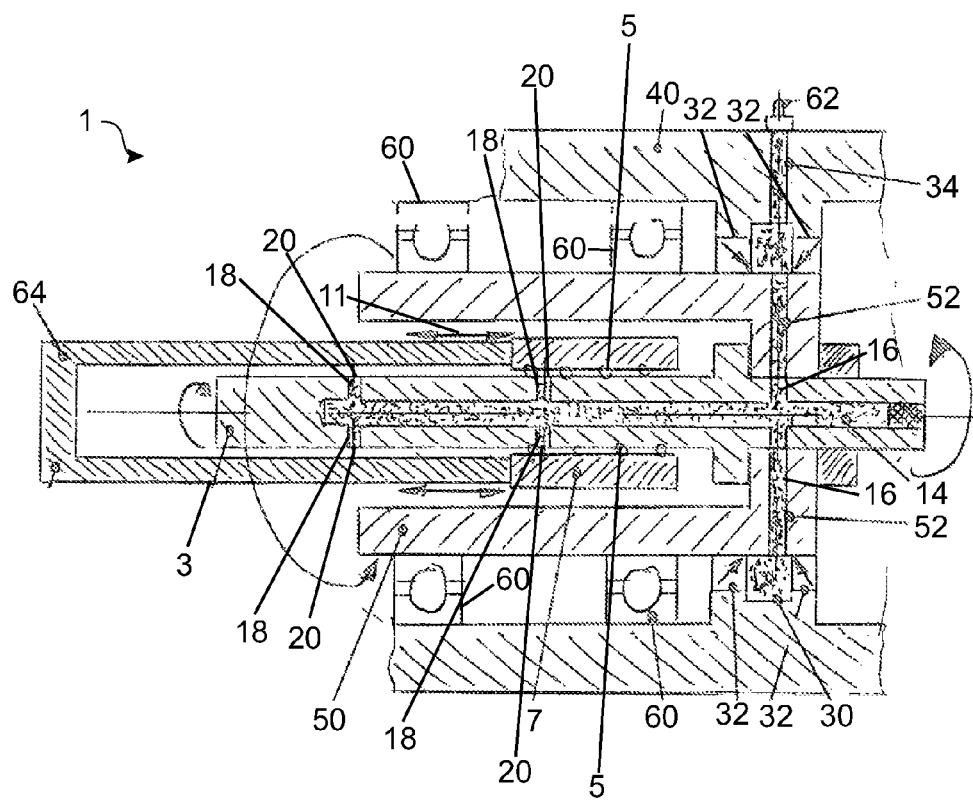
FIG. 2 shows a section through a further embodiment.

FIG. 2 shows one embodiment which likewise has a rotating spindle 3. Once again, a spindle nut 7 is moved linearly along double arrows 11. In the description of FIG. 2, identical designations are used for identical or similar parts. It should be clear, however, that the parts can be configured differently, the invention not being restricted to the described embodiments, moreover, but rather being defined by the scope of the claims.

In contrast to the embodiment of FIG. 1, the embodiment of FIG. 2 has a drive rotor which, as in the example of FIG. 2, can be configured as a hollow-shaft rotor 50. The spindle 3 is driven and rotated by way of the hollow-shaft rotor 50. Here, the rotatable channel system is supplemented by radial rotor channels which can be called radial lubricating channels and belong to the rotatable lubricating channel system. The radial rotor channels immediately adjoin the second radial lubricating channels 18 of the rotatable spindle 3. It is achieved in this way that a lubricant feed is possible through the hollow-shaft rotor 50. The transfer space 30 is accordingly arranged in a concentrically annular manner around the hollow-shaft rotor 50 in the region of the radial rotor channels 52.

In the exemplary embodiment of FIG. 2, the hollow-shaft rotor 50 is mounted within a housing 40 by way of bearings 60. A stationary lubricating channel 34 for supplying the transfer space 30 leads through the housing 40. In the embodiment shown of FIG. 2, the transfer space 30 is configured so as to be completely circumferential in an annularly concentric manner, it being possible in further embodiments for interruptions of the annular shape to be provided, in particular in combination with a plurality of stationary lubricating channels which can supply sections of a multiple-part transfer space. In the exemplary embodiment of FIG. 2, a lubricating nipple 62 on the outer side of the housing 40 is shown diagrammatically on the stationary lubricating channel 34. Manual lubrication is possible by way of the lubricating nipple 62. In the exemplary embodiments, automatic lubricating systems and lubricants can be exchanged as desired, in order to achieve a supply with lubricant.

Furthermore, FIG. 2 shows a torque tube 64 which is connected to the spindle nut 7 in a torsionally rigid manner and fixedly so as to rotate with it. It should be noted that the torque tube 64 with the spindle nut 7 performs exclusively axial movements and is mounted in a rotationally fixed manner.

Figure 3:
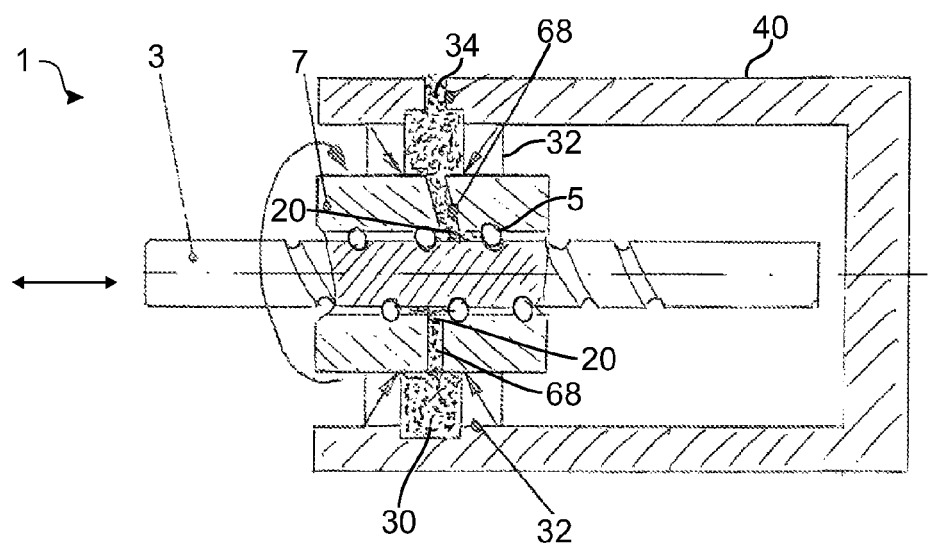
FIG. 3 shows a sectional view of a further embodiment.

The outline diagram of FIG. 3 shows a further basic arrangement of embodiments. In FIG. 3, once again identical designations are used for identical or similar parts. In the embodiment of FIG. 3, there is in principle the difference with respect to the embodiments of FIGS. 1 and 2 that a rotational movement of the spindle nut is used, in order to achieve an axial movement of the spindle.

In the exemplary embodiment of FIG. 3, a rotatable channel system is provided within the spindle nut 7, in order to supply the intermediate space between the spindle nut 7 and the spindle 3 having the rolling bodies 5 with lubricant. To this end, radial lubricating channels 68 are provided. Here, the expression "radial" expressly comprises lubricating channels of the rotatable channel system which are inclined with respect to a radial direction, for example are inclined by between 0° and 20° or 0° and 40°. The background for this is, as in the case of the radial lubricating channel 68 which is shown above in FIG. 3, a diversion is necessary under some circumstances next to a groove of the toothing system of the spindle nut 7, in order to achieve a free lubricating channel outlet 20.

Once again, a stationary lubricating channel 34 is arranged in a housing 40 of the spindle drive 1 of FIG. 3, as in the spindle drives of FIGS. 1 and 2, in order to supply a transfer space 30 with lubricant, which transfer space 30 for its part supplies the radial lubricating channels 68 of the spindle nut 7 with lubricant. The transfer space 30 is sealed by way of shaft seals 32.

Figure 4:
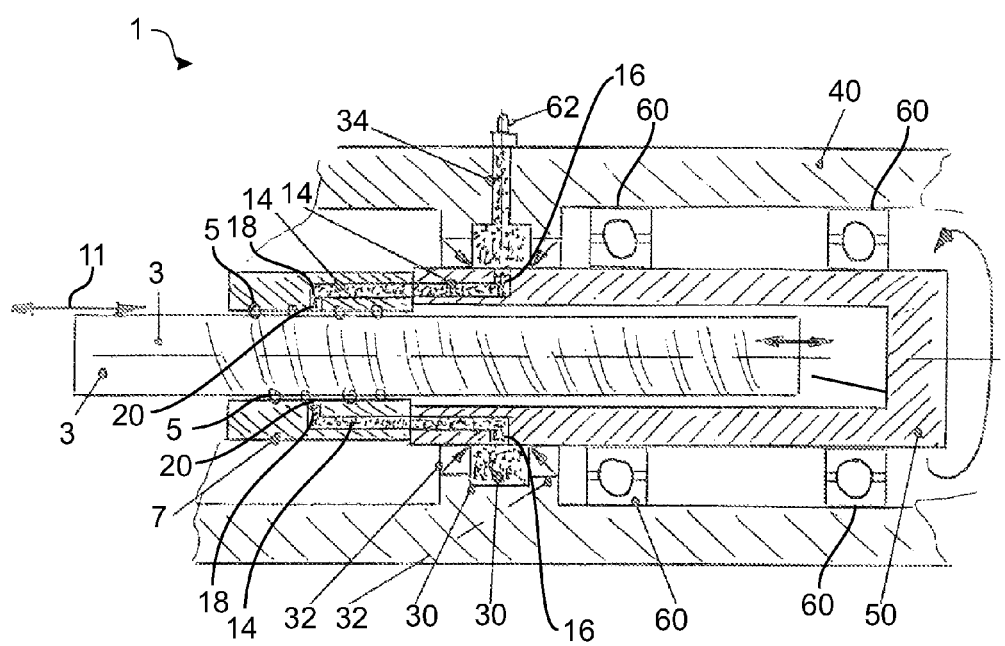
FIG. 4 diagrammatically shows a further embodiment in a sectional view.

In embodiments, the rotatable channel system comprises at least one longitudinal channel, as in the case of the embodiments of FIGS. 1 and 2, for example. FIG. 4 also shows an embodiment of this type having at least one longitudinal channel. In further embodiments, the rotatable channel system is free from longitudinal channels.

FIG. 4 shows a further embodiment which is supplemented by a hollow-shaft rotor 50 as drive rotor in comparison with the embodiment of FIG. 3. In addition, the spindle drive 1 has further differences. For instance, the rotatable channel system has longitudinal channels 14 which lead to second radial lubricating channels 18 in the spindle nut 7. The longitudinal channels 14 are supplied with lubricant via first radial lubricating channels 16. Here, the longitudinal channel 14 leads both through the drive rotor 50 and through the spindle nut 7. Here, the first radial lubricating channels 16 lie within the drive rotor 50 and could therefore also be called radial rotor channels.

In the exemplary embodiment of FIG. 4, two longitudinal channels 14 are shown with the associated first and second radial lubricating channels 16 and 18. The longitudinal channels 14 run in each case both through the drive rotor 50 and through the spindle nut 7. In embodiments, further longitudinal channels can be provided, for example four or six distributed over the circumference. The longitudinal channels 14 are supplied with lubricant by a transfer space 30 and the first radial lubricating channels 16. The transfer space 30 is arranged between a housing 40 and the drive rotor 50 and is sealed by shaft seals 32. The drive rotor 50 is mounted in the housing 40 by way of the bearings 60, which drive rotor 50 is connected fixedly to the spindle nut 7 so as to rotate with it and can achieve an axial movement of the spindle 3 along the double arrows 11 by way of a rotation of the spindle nut 7 via an engagement with rolling bodies 5.

The invention claimed is:

1. A spindle drive for a linear actuator comprising a spindle, a spindle nut which interacts with the spindle, and a lubricating channel outlet which opens between the spindle and the spindle nut for lubricating the spindle and the spindle nut, the spindle drive further comprising a stationary channel system and a rotatable channel system connected to the stationary channel system for feeding lubricant to the lubricating channel outlet, wherein the rotatable channel system is arranged at least partially in at least one of the spindle and a hollow-shaft rotor of the spindle drive, wherein the rotatable channel system comprises a radial channel, and wherein the spindle drive comprises a transfer space which is arranged between the stationary channel system and the rotatable channel system, wherein the transfer space is of annular configuration, and wherein the transfer space is configured to be at least partially concentric with respect to a longitudinal axis of the spindle.

2. A spindle drive according to claim 1, wherein the rotatable channel system in the spindle comprises a longitudinal channel and the radial channel which is connected to the longitudinal channel.

3. A spindle drive according to claim 1, wherein the radial channel opens directly into the lubricating channel outlet.

4. A spindle drive according to claim 1, wherein the spindle is connected to a hollow-shaft rotor so as to rotate therewith, wherein the rotatable channel system runs through the hollow-shaft rotor.

5. A spindle drive according to claim 1, wherein rolling bodies are arranged between the spindle and the spindle nut.

* * * * *